(12) United States Patent
Worley et al.

(10) Patent No.: US 12,030,357 B2
(45) Date of Patent: Jul. 9, 2024

(54) ADJUSTABLE SENSITIVITY CONTROLLING SYSTEM FOR SHOCK ABSORBERS

(71) Applicant: SUSPENSION DIRECT, INC., Lake Elsinore, CA (US)

(72) Inventors: Daniel J. Worley, Lake Elsinore, CA (US); Clement J. Fiore, Corona, CA (US)

(73) Assignee: SUSPENSION DIRECT, INC., Lake Elsinore, CA (US)

( * ) Notice: Subject to any disclaimer, the term of this patent is extended or adjusted under 35 U.S.C. 154(b) by 0 days.

(21) Appl. No.: 17/307,246

(22) Filed: May 4, 2021

(65) Prior Publication Data

US 2022/0355637 A1 Nov. 10, 2022

(51) Int. Cl.
| | |
|---|---|
| B60G 17/0165 | (2006.01) |
| B60G 13/08 | (2006.01) |
| B60G 17/08 | (2006.01) |

(52) U.S. Cl.
CPC ......... *B60G 17/0165* (2013.01); *B60G 13/08* (2013.01); *B60G 17/08* (2013.01); *B60G 2202/24* (2013.01); *B60G 2204/62* (2013.01); *B60G 2206/41* (2013.01); *B60G 2500/104* (2013.01); *B60G 2600/182* (2013.01); *B60G 2600/20* (2013.01); *B60G 2800/162* (2013.01); *B60G 2800/916* (2013.01)

(58) Field of Classification Search
CPC .... B60G 17/0165; B60G 13/08; B60G 17/08; B60G 2202/24; B60G 2204/62; B60G 2206/41; B60G 2500/104; B60G 2600/182; B60G 2600/20; B60G 2800/162; B60G 2800/916

See application file for complete search history.

(56) References Cited

U.S. PATENT DOCUMENTS

| | | | | | |
|---|---|---|---|---|---|
| 5,477,947 | A | * | 12/1995 | Schalles | F16F 9/516 188/298 |
| 6,053,269 | A | * | 4/2000 | Patten | B60G 17/0152 180/167 |
| 2005/0133978 | A1 | * | 6/2005 | Lemmens | B60G 17/08 267/140.15 |
| 2006/0180372 | A1 | * | 8/2006 | Mercier | B62K 5/027 303/146 |
| 2015/0057885 | A1 | * | 2/2015 | Brady | B60G 17/0165 701/37 |
| 2017/0305226 | A1 | * | 10/2017 | Okimura | B60G 17/033 |
| 2018/0216692 | A1 | * | 8/2018 | Coaplen | F16F 9/348 |
| 2018/0354336 | A1 | * | 12/2018 | Oakden-Graus | B60G 17/016 |
| 2019/0154100 | A1 | * | 5/2019 | Coaplen | B60G 15/062 |
| 2020/0156430 | A1 | * | 5/2020 | Oakden-Graus | B60G 17/0164 |
| 2021/0008948 | A1 | * | 1/2021 | Kirar | F16F 9/084 |

* cited by examiner

*Primary Examiner* — Toan C To
(74) *Attorney, Agent, or Firm* — Mintz, Levin, Cohn, Ferris, Glovsky and Popeo, P.C. US

(57) ABSTRACT

This invention pertains to shock absorbers, and a method of controlling their operation. Specifically, this invention relates to use of a user interface allowing to control the sensitivity of various parameters used by a programmed electronic control unit. When in operation, said electronic control unit automatically send calculated and user-adjusted electronic signals to electronic control devices which proportionally regulate flow of fluid within each shock absorbers of a vehicle.

7 Claims, 4 Drawing Sheets

ADJUSTABLE SENSITIVITY CONTROLLING SYSTEM FOR SHOCK ABSORBERS

This application claims the benefit of U.S. Provisional Patent Application Ser. No. 63/035,150, filed Jun. 5, 2020. The entire contents of Application Ser. No. 63/035,150 are hereby incorporated by reference herein.

FIELD OF THE INVENTION

This invention pertains to shock absorbers, and a method of controlling their operation. Specifically, this invention relates to use of a user interface allowing to control the sensitivity of various parameters used by a programmed electronic control unit. When in operation, said electronic control unit automatically send calculated and user-adjusted electronic signals to electronic control devices which proportionally regulate flow of fluid within each shock absorbers of a vehicle.

BACKGROUND OF THE INVENTION

Shocks and other hydraulic suspension cylinders for vehicles typically function by forcibly moving an incompressible liquid back and forth on a fluid path in response to its interaction with a compressible gas. In detail, while the gas is being compressed by the moving force of the liquid, the gas reacts as a spring in response to this movement. On the other hand, as the compressed gas is allowed to expand in reaction to the moving liquid, it forces the liquid to return to a neutral position on the fluid path. It is also known that some devices for a similar purpose are configured much like a conventional dash pot.

Heretofore, the general approach for adjusting the response characteristics of these hydraulic suspension cylinders has been to modify the fluid path by moving an in-line valve member directly along the fluid path. More specifically, this has been accomplished by increasing or decreasing the in-line cross-section area of the fluid path.

Past electronically controlled shocks and hydraulic suspension cylinders utilize the positioning of a valve member in a direction that is substantially perpendicular to the shock absorbers fluid path, within the top mounting, or bridge near the gas reservoir, of the cylinder to change the response characteristics of the cylinder.

Said valve member usually comprises an actuator controlled with an electronic input calculated and generated by an electronic control unit. The calculation of said electronic input depends on vehicle data, such as speed, shock shafts velocity, and tilt angles, or on user input, through a switch or an interactive screen.

One example of such electronically controlled shock absorbers is described and shown in U.S. Pat. No. 9,120,362, and depicts at least one electronically controlled shock absorber, controlled by a logic unit (or an electronic control unit) receiving inputs from vehicle transducers (or sensors) and user settings, and generating electronic outputs sent to the electronic control valves mounted on said shock absorber.

In the event of using an electronic control unit to calculate and generate electronic outputs by correlating vehicle's inputs and user-programmed settings, such design would not allow user to adjust and tune setting remotely and on the go, as no remoted user interface are disclosed and programming electronic control unit without a remoted user interface would require stopping the vehicle and the use of advanced skills.

Another example of such electronically controlled shock absorbers is described and shown in U.S. Pat. No. 9,027,937, and depicts at least one electronically controlled shock absorber, controlled by an electronic control unit harvesting settings from a remote electronic device, and data relating to vehicle and conditions in which it operates. Said electronic control unit then generates and send electronic outputs to the electronic control valves mounted on said shock absorber.

While using a remote electronic device to adjust settings allows user to control a shock absorber characteristics response remotely and on the go, such design would still restrict the possibility of adjustment of said electronic control, as it would only allow changes according to available pre-set options of settings programmed within electronic control unit, and would not allow to calibrate vehicle data generated by vehicle's sensors.

In any event, past shock absorber electronic controls only rely on an electronic control unit to calculate and generate electronic outputs by correlating vehicle's inputs and user settings. In addition of restricting the amount of adjustment possibilities, it also involves a lot of calculations, which creates additional problems such as managing efficiently the electronic control unit memory, calculation capacity, calculation frequency, electric energy usage and heat dissipation. Such suitable electronic control unit would significantly rise the production cost of said electronically controlled shock absorbers.

To achieve optimum electronic control of a vehicle's shock absorbers response characteristic, it would be advantageous to develop innovative devices allowing efficient and more tunable user-friendly control.

SUMMARY OF THE INVENTION

The object of the present invention is to provide a way of adjusting the response characteristics of shock absorbers by using a user interface allowing to control the sensitivity of various parameters used by a programmed electronic control unit. When in operation, said electronic control unit receives vehicle sensors electronic signals automatically send calculated and user-adjusted electronic signals to electronic control devices which proportionally regulate the flow rate of fluid travelling within each shock absorbers of a vehicle.

BRIEF DESCRIPTION OF THE DRAWINGS

A clear understanding of the adjustable sensitivity control of shock absorbers summarized above may be had by examining the figures below. The figures display and reference the assembly, which are not necessarily drawn to scale. Accordingly.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Furthermore, the term "shock absorber" refers to any hydraulic cylinder or damper cylinder, such as a shock or similar devices, while "eyelet" refers to the mounting of the shock absorbers shaft to a chassis mounting point.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that several techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

An adjustable sensitivity controlling system for shock absorbers and its use is discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

Figure 1:
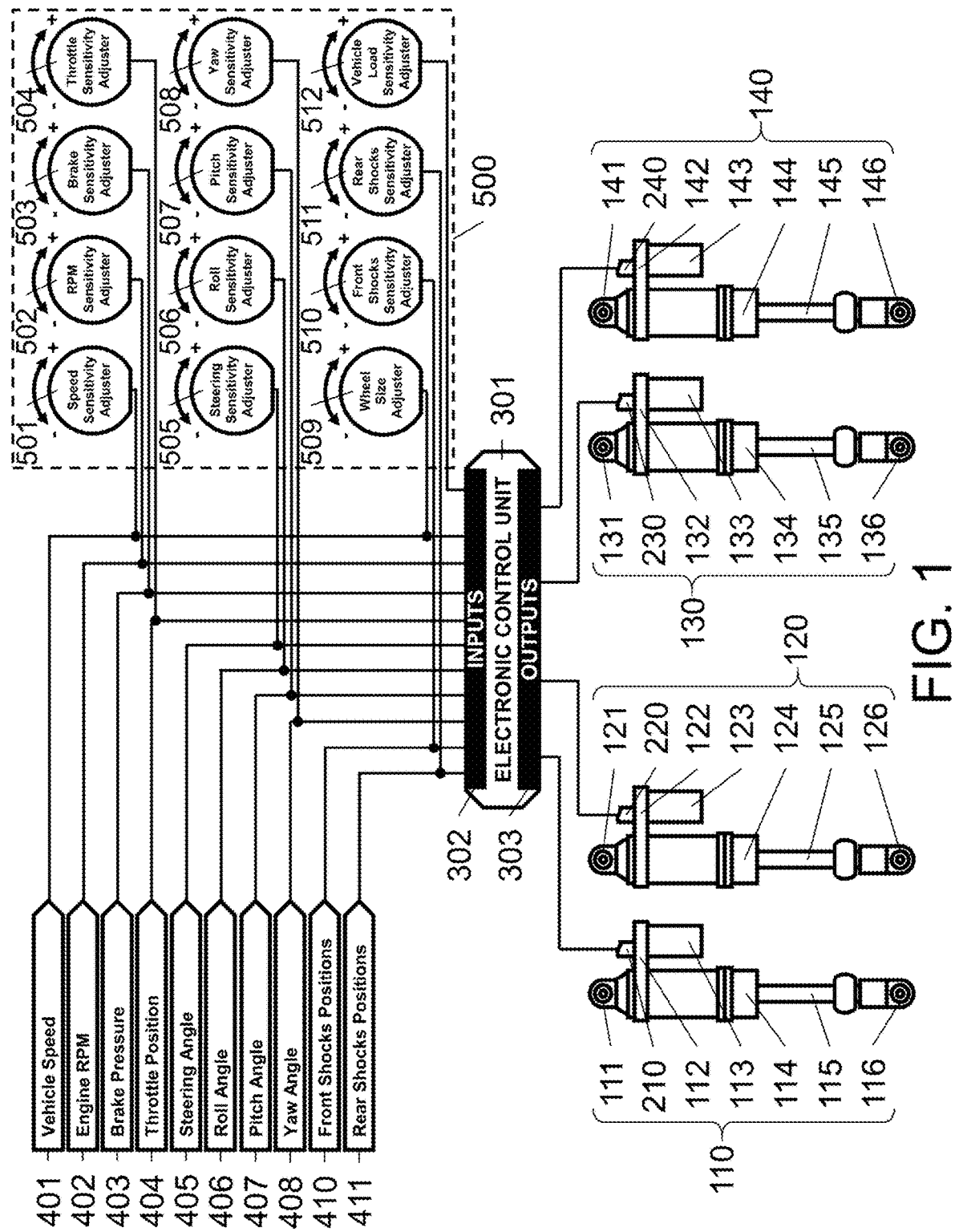
FIG. 1: Illustrates four shock absorbers (110), (120), (130) and (140) mounted to a vehicle, and electronically controlled by the electronic control unit (301) receiving adjusted inputs. Said adjusted inputs are generated by vehicle's sensors whose sensitivities are tuned by user thanks to user interface (500).

The present invention will now be described by referencing the appended figures representing preferred embodiments. FIG. 1 depict a vehicle shock absorber system and its components, shock absorber main shafts (115), (125), (135), and (145) travels respectively through shock absorber main bodies (114), (124), (134), and (144). Said shock absorbers are usually, but not exclusively, mounted on a vehicle with main body mounting eyelets (111), (121), (131), and (141) connected to each opposite sides of vehicle's frame or sub-frame, and main shaft mounting eyelets (116), (126), (136), and (146) connected to each opposite vehicle's wheel sides.

Electronically controlled valves (210), (220), (230), and (240) receive electronic outputs generated by the electronic control unit (301) and transmitted through outputs terminal and associated wiring (303). Said electronic outputs are determined automatically by an algorithm programmed into said electronic control unit (301) and calculated with transmitted and adjusted inputs received through inputs terminal and associated wiring (302). Said transmitted and adjusted inputs are generated from vehicle sensors such as vehicle speed (401), engine revolutions per minute (402), brake pressure (403), throttle position (404), steering angle (405), roll angle (406), pitch angle (407), yaw angle (408), front shocks positions (410), and rear shocks positions (411).

Figure 3:
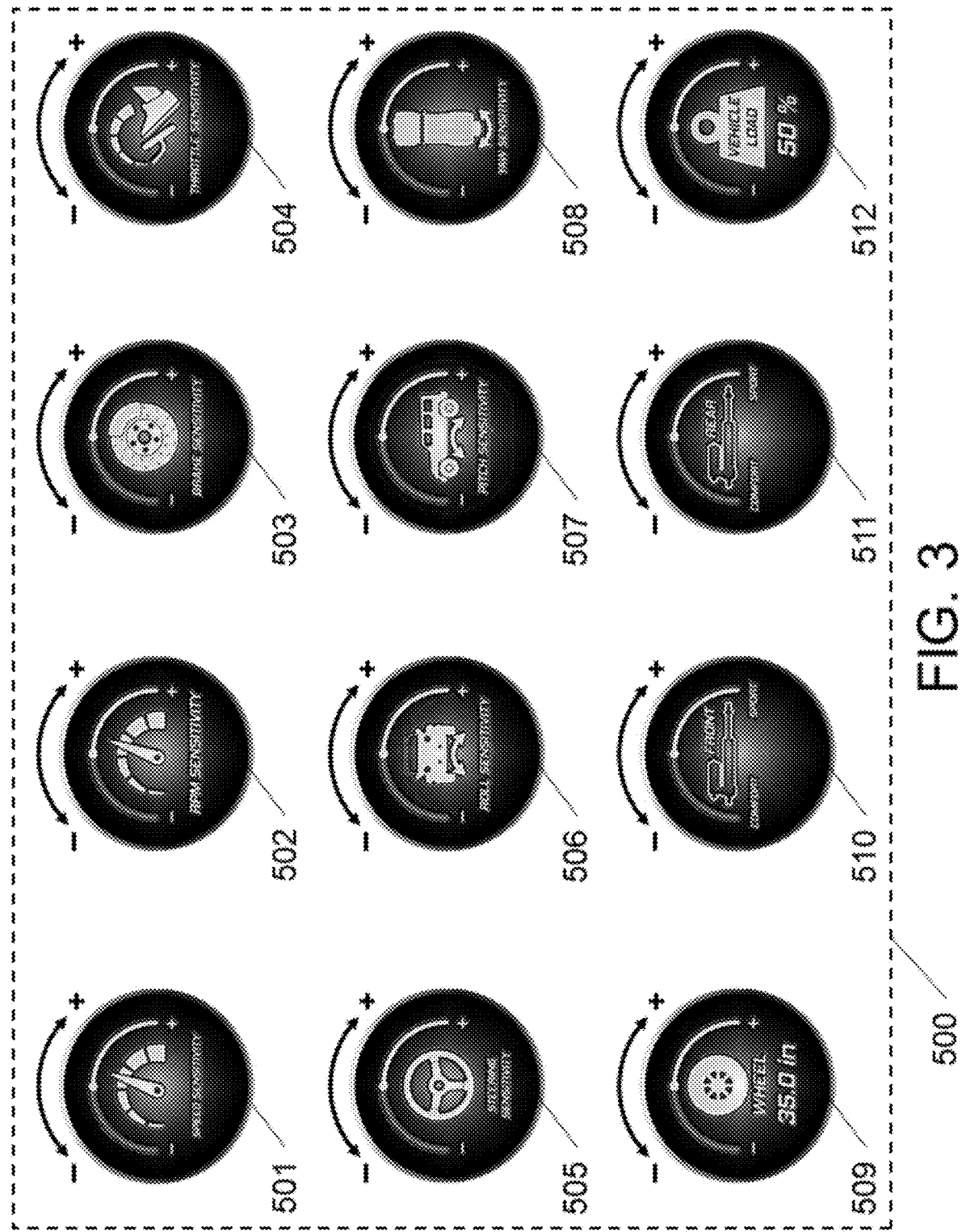
FIG. 3: Illustrates examples of user-friendly visual displays of sensitivity control options from user interface (500) depicted in FIG. 1 and FIG. 2.

Each said generated inputs are then adjustable by the user interface (500), allowing the user to manually tune and calibrate, increase or decrease, each sensor sensitivity remotely and on the go by using visual displays, as seen on FIG. 3, such as vehicle speed sensitivity adjuster (501), engine revolutions per minute sensitivity adjuster (502), brake pressure sensitivity adjuster (503), throttle position sensitivity adjuster (504), steering angle sensitivity adjuster (505), roll angle sensitivity adjuster (506), pitch angle sensitivity adjuster (507), yaw angle sensitivity adjuster (508), front shocks positions sensitivity adjuster (510), and rear shocks positions sensitivity adjuster (511).

When in operation, said electronic control unit (301) calculates, generates and transmits electronic outputs to the electronically controlled valves (210), (220), (230), and (240), which respectively regulate the flow rate of fluid traveling: between shock absorber fluid reserve (113) and shock absorber main body (114) through shock absorber bridge (112), between shock absorber fluid reserve (123) and shock absorber main body (124) through shock absorber bridge (122), between shock absorber fluid reserve (133) and shock absorber main body (134) through shock absorber bridge (132), and between shock absorber fluid reserve (143) and shock absorber main body (144) through shock absorber bridge (142). Ultimately, the operation of said electronically controlled valves (210), (220), (230), and (240) respectively increases or decreases the response characteristics of the vehicle's shock absorbers (110), (120), (130), and (140).

Figure 2:
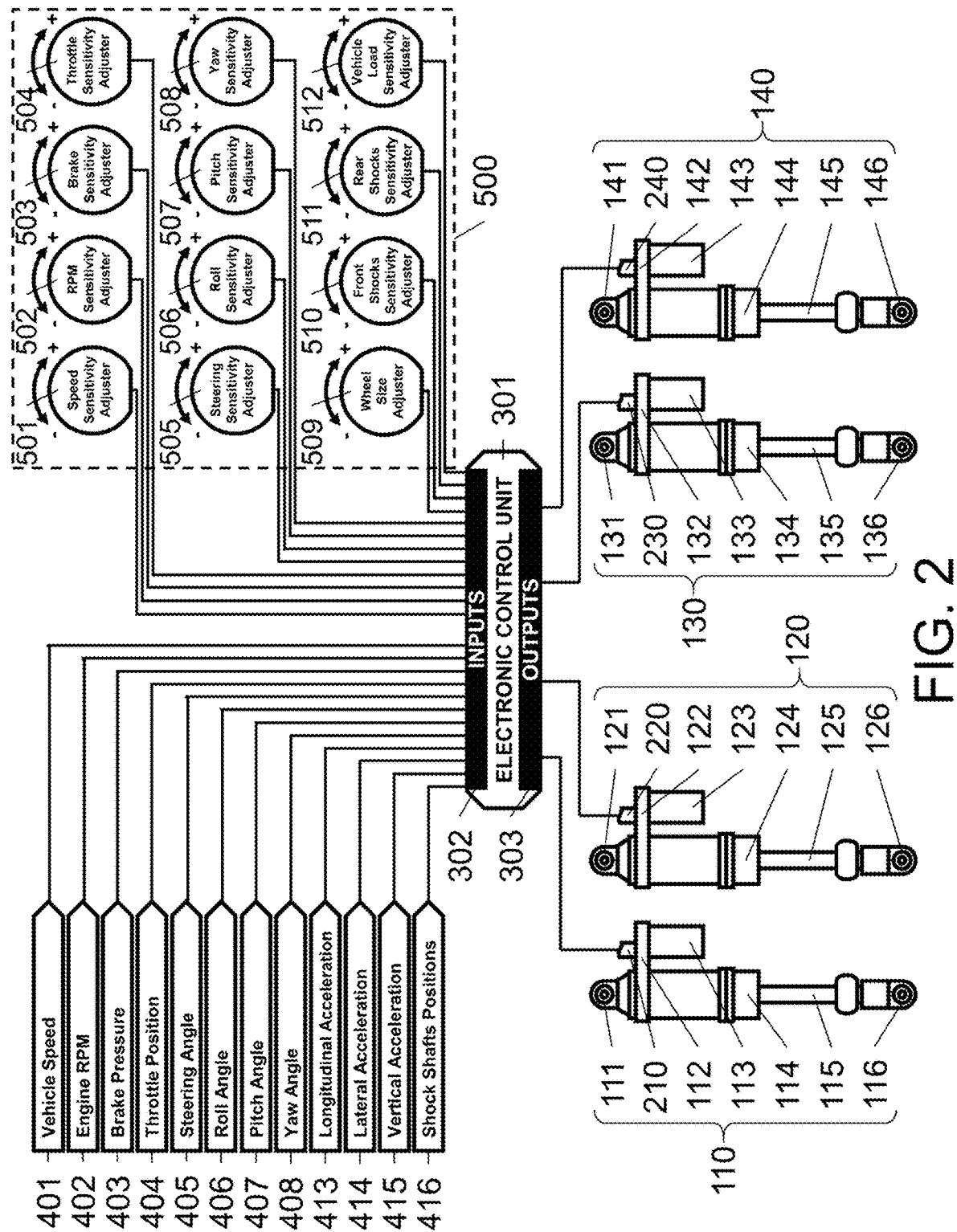
FIG. 2: Illustrates another wiring solution for the system depicted in FIG. 1, where the electronic control unit (301) receives inputs generated by vehicle's sensors and from sensitivity control options of user interface (500).

As seen on FIG. 2, said electronic outputs are determined automatically by an algorithm programmed into said electronic control unit (301) and calculated with transmitted inputs received through inputs terminal and associated wiring (302). Said transmitted inputs are generated from vehicle sensors such as vehicle speed (401), engine revolutions per minute (402), brake pressure (403), throttle position (404), steering angle (405), roll angle (406), pitch angle (407), yaw angle (408), longitudinal acceleration (413), lateral acceleration (414), vertical acceleration (415), shock shafts positions (416), and from the sensitivity control options of the user interface (500), through visual displays, as seen on FIG. 3, such as vehicle speed sensitivity adjustment (501), engine revolutions per minute sensitivity adjustment (502), brake pressure sensitivity adjustment (503), throttle position sensitivity adjustment (504), steering angle sensitivity adjustment (505), roll angle sensitivity adjustment (506), pitch angle sensitivity adjustment (507), yaw angle sensitivity adjustment (508), front shocks positions sensitivity adjustment (510), and rear shocks positions sensitivity adjustment (511). Said generated inputs from vehicle's sensors are then calibrated within said electronic control unit (301) thanks to generated inputs from the user interface sensitivity control options.

As seen on FIG. 1, FIG. 2, and FIG. 3, said user interface (500) offers a wheel size calibration functionality (509) allowing the user to input the size of said vehicle wheels, in order to precisely adjust the vehicle speed electronic signal out of the vehicle speed sensor (401). Such functionality is essential in the event of a wheel size modification on the vehicle.

As seen on FIG. 1, FIG. 2, and FIG. 3, said user interface (500) also offers a vehicle load calibration functionality (512) allowing the user to input the percentage of said vehicle's load weight, in order to precisely adjust the vehicle's shock absorbers response characteristics according to said vehicle's current weight. Such functionality is essential in the event of hosting rear passengers or transporting goods in the vehicle.

Figure 4:
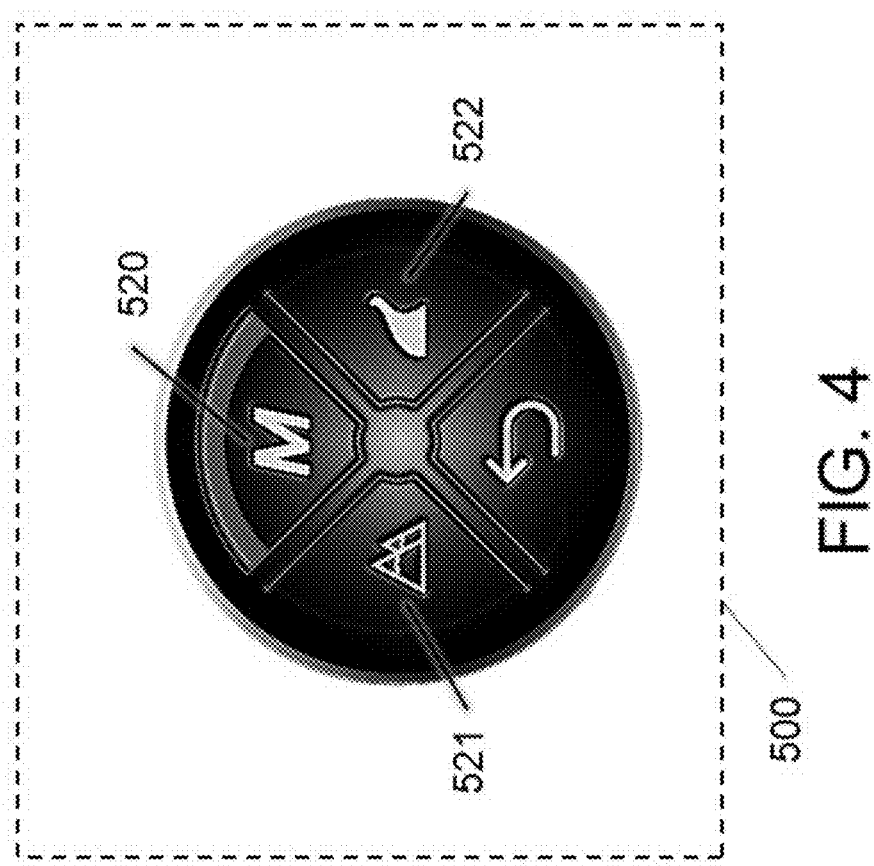
FIG. 4: Illustrates examples of user-friendly visual displays of terrain mode selection for sensitivity control options from user interface (500) depicted in FIG. 1 and FIG. 2.

As seen on FIG. 4, said user interface (500) further offers a mode selection functionality allowing the user to input the type of terrain or road conditions such as off-road (521) or on-road (522), in order to precisely adjust the vehicle's shock absorbers response characteristics according to said vehicle's surrounding environment. Another manual mode (520) can be selected to manually adjust the vehicle's shock absorbers response characteristics according to user input only.

This adjustable sensitivity controlling system for shock absorbers is designed to work with any style of electronically controlled shock absorbers. This design offers an efficient and performant way of electronically controlling the response characteristics of a vehicle's shock absorbers, as all parameters and vehicle data involved in the calculation and generation of the electronic outputs are tunable and adjustable by user through a very user-friendly remoted visual display, rather than adding and programming additional settings into the electronic control unit.

It also provides precise performance, as features allow vehicle speed calibration according to the actual vehicle wheels size, and vehicle weight distribution compensation, which offer great balance control of the vehicle and provide safer driving condition.

Electric energy savings is another great advantage of the present adjustable sensitivity control system for shock absorbers, as electronic control unit calculation efficiency is optimized.

Finally, the production cost of such system is lowered as less performance are required from the electronic control unit for the proper functionality, which also allows an easier adaptation on any vehicle as less restrictions are involved, such as heat dissipation, for proper mounting and usage performances.

The invention claimed is:

1. An adjustable sensitivity controlling system for shock absorbers, comprising at least one shock absorber composed of: a main body comprising a mounting eyelet, a main shaft traveling through said main body and comprising a piston and a mounting eyelet, a bi-directional electronically controlled valve, an electronic control unit composed of inputs terminals and associated wiring, and outputs terminals and associated wiring, a set of vehicle sensors broadcasting data relating to vehicle's operational parameters, including speed, brake pressure, throttle position, tilt angles, accelerations, shock shafts velocities and shock shafts positions, and a user interface, and where said shock absorber is linking one vehicle's wheel axle side to said vehicle's frame side, said user interface allows a vehicle's user to manually and remotely adjust, calibrate, increase, or decrease the sensitivity of each electronic signals generated by said vehicle's set of sensors, said electronic control unit is programmed with an algorithm that determined electronic outputs automatically, by receiving and calculating said generated and adjusted electronic signals transmitted through said inputs terminal and associated wiring, said bi-directional electronically controlled valve is piloted by said electronic outputs generated by said electronic control unit and transmitted through said outputs terminal and associated wiring, and where the operation of said bi-directional electronically controlled valve regulate the flow rate of fluid within said shock absorber, which ultimately increases or decreases the response characteristics of said vehicle's shock absorbers.

2. An adjustable sensitivity controlling system for shock absorbers according to claim 1 wherein: said shock absorber further comprises: an accumulator composed of a fluid reserve, and a bridge, connecting fluid reserve to said main body, and where the operation of said bi-directional electronically controlled valve regulate the flow rate of fluid traveling between said shock absorber fluid reserve and said shock absorber main body through shock absorber bridge.

3. An adjustable sensitivity controlling system for shock absorbers according to claim 1 or claim 2 wherein: said user interface comprises a touch-controlled visual display device offering a combination of sensitivity adjustments options allowing a vehicle's user to manually and remotely adjust, calibrate, increase, or decrease the sensitivity of each electronic signals generated by said vehicle's set of sensors.

4. An adjustable sensitivity controlling system for shock absorbers according to claim 1 wherein: said user interface offers a vehicle speed calibration functionality allowing the user to input the size of said vehicle wheels, in order to precisely read the vehicle speed out of the vehicle speed sensor in the event of a wheel size modification on the vehicle.

5. An adjustable sensitivity controlling system for shock absorbers according to claim 1 wherein: electronic signals are generated by said vehicle's set of sensors and by vehicle's user thanks to said user interface allowing to manually and remotely select adjustment and calibration control options related to the sensitivity of each vehicle's sensor electronic signals, and where said electronic control unit is programmed with an algorithm that determined electronic outputs automatically, by receiving and calculating said generated electronic signals from said vehicle's set of sensors and said user interface, transmitted through said inputs terminal and associated wiring.

6. An adjustable sensitivity controlling system for shock absorbers according to claim 1 wherein: said user interface further comprises a combination of mode adjustments options allowing a vehicle's user to select manually and remotely a type of terrain including off-road or on-road, or a profile including comfort and performance, and said electronic control unit is programmed to further adjust the sensitivity of each electronic signals generated by said vehicle's set of sensors based on said mode adjustment selected by user.

7. A vehicle composed of an adjustable sensitivity controlling system for shock absorbers according to claim 1.

* * * * *

UNITED STATES PATENT AND TRADEMARK OFFICE
CERTIFICATE OF CORRECTION

| | | |
|---|---|---|
| PATENT NO. | : 12,030,357 B2 | Page 1 of 1 |
| APPLICATION NO. | : 17/307246 | |
| DATED | : July 9, 2024 | |
| INVENTOR(S) | : Daniel J. Worley and Clement J. Fiore | |

It is certified that error appears in the above-identified patent and that said Letters Patent is hereby corrected as shown below:

On the Title Page

Item (60) Related U.S. Application Data, please add:
Provisional application No. 63/035,150, filed on Jun. 5, 2020.

Signed and Sealed this
Twentieth Day of August, 2024

*Katherine Kelly Vidal*

Katherine Kelly Vidal
*Director of the United States Patent and Trademark Office*